Figure 1:
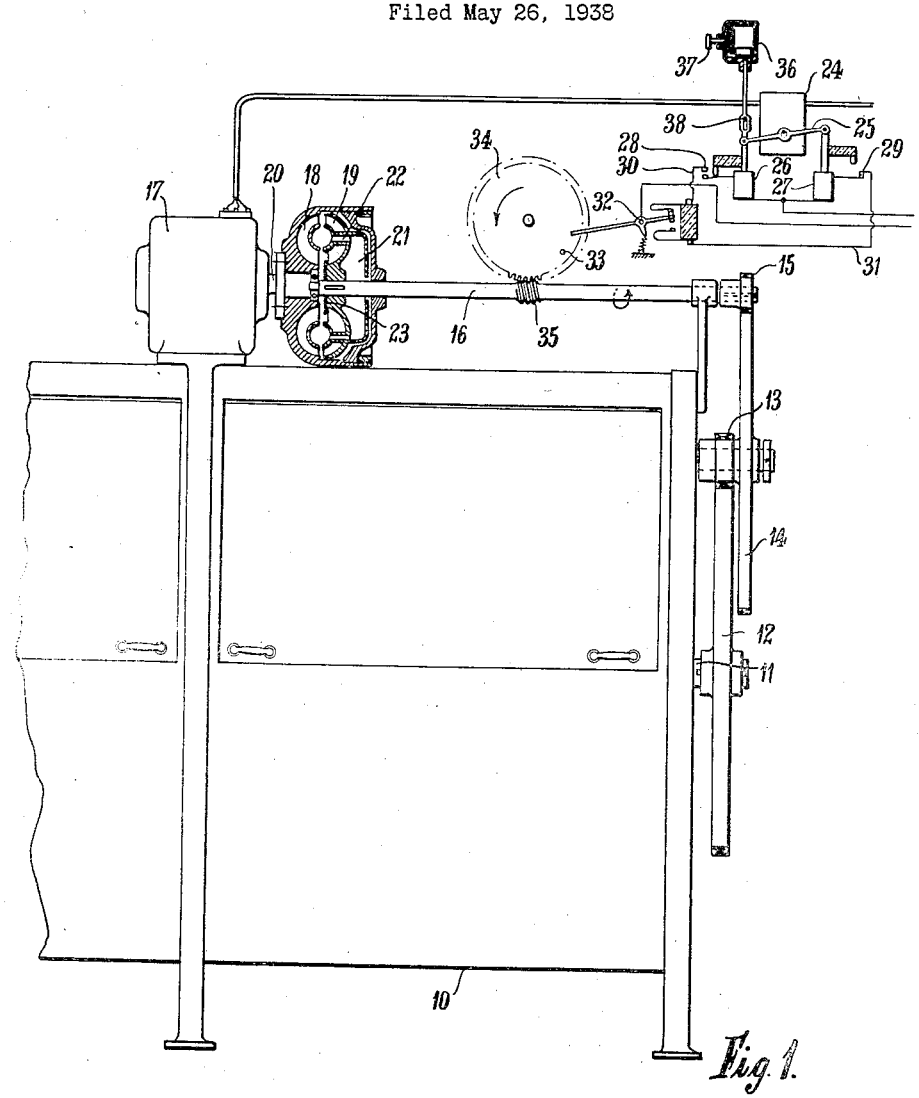

April 8, 1941.  H. SINCLAIR  2,237,373
REVERSING MECHANISM
Filed May 26, 1938

Inventor
Harold Sinclair

Patented Apr. 8, 1941

2,237,373

UNITED STATES PATENT OFFICE 2,237,373

REVERSING MECHANISM

Harold Sinclair, Kensington, London, England

Application May 26, 1938, Serial No. 210,198
In Great Britain August 27, 1937

2 Claims. (Cl. 172—239)

This invention relates to mechanism of the kind in which a driven member having substantial inertia is required to be moved continuously in one direction for a limited period, brought to rest, immediately moved in the opposite direction, after a limited period again brought to rest and immediately moved in the original direction, this cycle of operations being repeated for as long as is desired.

The inertia of the driven member is substantial enough, in relation to the speed at which it normally moves and the friction normally opposing its movement, to enable it to continue moving after the driving motor has been de-energized. Owing to its inertia, the driven member resists any attempt to change its state of motion and consequently the consumption of power is considerably higher during the reversals of the driven member than during the rest of the cycle of operation. The driving motor must therefore be capable of repeatedly producing high power peaks.

An object of the present invention is to provide mechanism of the kind set forth in which the duration and to a lesser extent the amplitude of the cyclic power peaks are substantially reduced.

According to the present invention, mechanism of the kind set forth comprises a reversible driving motor which is connected through a hydraulic coupling of the kinetic type to the driven member having substantial inertia, the arrangement being such that, during reversals, variation of the ratio of the speeds of the driving motor and of the driven member occurs only in consequence of the slip in the hydraulic coupling.

This invention makes use of the following properties of a hydraulic coupling of the kinetic type. When one element of the coupling is rotated at a given speed and the other element of the coupling is arrested, the coupling transmits a high torque, since in this condition the velocity of vortex circulation between the impeller and the runner is high. If the arrested element is allowed to accelerate, the liquid passing radially inwards through it is subjected to a centrifugal force which opposes the vortex circulation and, if the speed of the first-mentioned element remains constant, the vortex velocity and the torque transmitted fall.

If the torque is interrupted, e. g. during reverse of the motor, the vortex circulation collapses, and the liquid at this instant attempts to form an inert ring compacted against the radially outer part of the boundary of the working circuit. During the short time while the liquid vortex is collapsing and the inert ring is forming, the contents of the working circuit are in a confused state, and any air that may be present is attempting to move from the core of the circuit to the neighbourhood of the axis of rotation of the coupling. If torque is suddenly re-applied to the coupling while its liquid content is in this confused state, the torque transmission capacity of the coupling is lower, during the short interval while the vortex is being re-established, than it would have been if the vortex had not collapsed or if the inert ring of liquid had been formed.

Furthermore, if, when one element of the coupling is being rotated, the second element instead of being allowed to accelerate in the same direction as the first element, is forcibly accelerated in the opposite direction, again the liquid passing through the second element is subjected to a centrifugal force which opposes the vortex circulation, and the torque transmitted becomes lower than it would have been if the second element had been kept stationary, in spite of the fact that the relative speed of the two elements is higher than the absolute speed of the first element.

The invention will be further described as applied to a laundry washing machine of the kind in which the rotatable receptacle containing the articles being washed is cyclically reversed.

In the accompanying drawing Fig. 1 is a part-sectional elevation of part of the machine, and Figs. 2 to 6 are diagrams showing various conditions in the working circuit of the hydraulic coupling of the machine shown in Fig. 1.

Referring to Fig. 1, the rotary receptacle is disposed inside a cylindrical casing 10 and fixed to a shaft 11 connected by reduction gearing 12, 13, 14, 15 to a shaft 16. A squirrel-cage electric motor 17 drives the shaft 16 through a hydraulic coupling of the Vulcan-Sinclair "traction" type, having an impeller 18 fixed to the motor shaft 20 and a runner 19 fixed to the shaft 16. The coupling includes a small reservoir 21 rotating with the runner, and ducts 22 transfer a part of the working liquid between the working circuit and the reservoir automatically in accordance with operating conditions, as described in my United States Patent No. 1,963,720.

There may be provided a fixed annular baffle 23 projecting part way across the working circuit, preferably at the radially innermost part of the boundary thereof, in order to reduce the vortex velocity when starting and thus enable the motor to start more easily.

Automatic control means are provided for reversing the motor 17 at uniform intervals. These means, shown diagrammatically in Fig. 1, include a reversing switch 24 having a control lever 25 actuated by solenoids 26 and 27 adapted, when energized, to put the switch into the "forward" and "reverse" positions respectively. The solenoids 26 and 27 are operatively connected respectively with contact-breakers 28 and 29 arranged to open the solenoid energizing circuits 30 and 31 respectively on arrival of the lever 25 in its respective end positions. The circuits 30 and 31 are alternatively energized by an actuating member having the form of a two-way toggle switch 32 arranged to be thrown over by a stud 33 on a worm-wheel 34 meshing with a worm 35 on the shaft 16.

A fluid dash-pot 36 is adapted to delay the movement of the reversing switch lever 25 to an extent which is variable by adjustment of a by-pass valve 37. The dash-pot is connected to the lever 25 by a lost-motion coupling 38 which permits rapid opening of the reversing-switch contacts.

The preferred method of operation of this apparatus will now be described.

Figures 2, 3, 4, 5, 6:
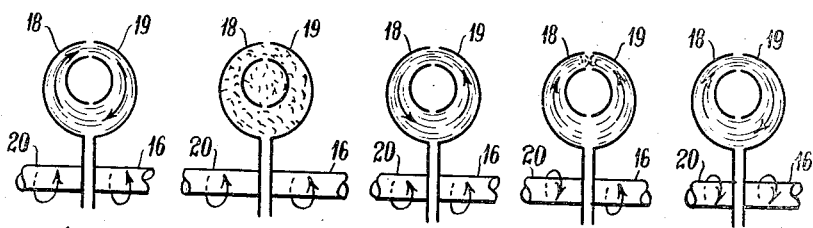

Fig. 1 shows the mechanism set for "forward" running. Under these conditions the shaft 16 and the worm-wheel 34 rotate in the direction of the arrows thereon. The circulation conditions in the hydraulic coupling are as shown in Fig. 2. When the pin 33 trips the switch 32, the solenoid 27 is energized, and the reversing switch lever 25 is immediately moved far enough to interrupt the current to the motor 17. The motor and the receptacle of the washing machine continue to rotate owing to their inertia. The damping imposed on the receptacle by its contents causes it to be retarded relatively more rapidly than the motor, so that a forward driving torque is still transmitted by the hydraulic coupling owing to the flywheel effect of the impeller 18 and the rotor of the motor 17. The circuit conditions are therefore still as shown in Fig. 2.

The adjustment of the dash-pot 36 is so set that the switch 24 causes the motor to be energized by current urging it in the reverse direction before the container has come to rest. The closing of the reversing switch 24 causes the torque through the coupling to be reversed, and the vortex momentarily breaks down, as shown in Fig. 3. While the coupling is in this condition, the inertia of the container acting through the hydraulic coupling imposes only a low resistance to the stopping of the motor by the reversed current, and the current peak is therefore of reduced amplitude. Shortly before the motor begins to run in the reverse direction, a vortex circulation in the coupling is established in the reversed direction, as shown in Fig. 4. Next the motor accelerates in the reverse direction, and since the impeller and runner of the coupling are now rotating in opposite directions, the vortex suffers a partial collapse and reforms in the condition shown in Fig. 5, wherein the torque load on the motor is lower than it would have been if the runner were at rest. Thus the motor is able to accelerate rapidly and the current peak is of brief duration. The runner and the container come smoothly to rest and are immediately accelerated in the reverse direction. The normal vortex circulation is re-established in the hydraulic coupling, as shown in Fig. 6, and as by now the motor is running at a substantial speed, it is able to generate the torque required to accelerate the container quickly without causing an excessive current peak.

A known standard model of washing machine, when reversed at intervals of 15 seconds, is normally fitted with a squirrel-cage motor of 5 horse-power. During starting, the motor imposes on the mains a current peak of about 58 amperes lasting for at least a second, and during each reversal the current peak is sustained twice as long. This machine, when modified in accordance with this invention, will operate satisfactorily, other things being equal, with a 3 horse-power motor which imposes a peak load of only 24 amperes for a small fraction of a second. The reduction in size of the motor is made possible chiefly by the reduced heat dissipation due to the shorter current peaks of somewhat reduced amplitude.

It will be obvious that this invention is applicable to other kinds of apparatus such for example as drying and heat treatment machines, furnace charging machines, manipulating roll devices and conveying and process machinery in which a driven member is required to be rotated or translated alternately in opposite directions with frequent reversals, and in which the driven member has sufficient flywheel effect to enable, during reversal, the driving motor and the driven member to move oppositely and thereby to establish in the hydraulic coupling the described condition of low torque transmission capacity.

I claim:

1. In an apparatus for driving a reversible rotary part having substantial inertia from a reversible driving motor serving to rotate said part continuously in one direction for a limited period and immediately thereafter in the other direction for a limited period, this cycle of operations being repeated, the combination of a hydraulic turbo coupling having an impeller connected to said motor and a runner connected to said part, a reversing controller for said motor, said controller including an actuating member, means for automatically operating said actuating member and means which, upon operation of said actuating member, first de-energize said motor and allow said motor and part to decelerate idly for a short period, and thereafter energize said motor in the reversed sense to cause said impeller and runner to rotate momentarily in opposite directions to rapidly stop the rotation of said part and immediately start its rotation in the same direction as that of the impeller.

2. In combination, a driven member having substantial inertia, a reversible driving motor serving to move said driven member alternately in one direction and the other direction, a hydraulic coupling of the kinetic type having an impeller connected to said driving motor and a runner connected to said driven member, a reversing controller for said motor, said controller including an actuating member and a delay-action device serving, on throwing-over of said actuating member, to cause a delay of such duration that the motor is energized in the reversed sense after the speeds of the motor and the driven member have decreased, but while both the motor and the driven member are still rotating in their original direction, whereupon the impeller is quickly stopped and started rotating in the opposite direction to that of the runner to rapidly stop the driven member and start it rotating in the same direction as the impeller, and automatic means for throwing over said actuating member from time to time.

HAROLD SINCLAIR.